(12) United States Patent
Cao et al.

(10) Patent No.: US 10,163,206 B2
(45) Date of Patent: Dec. 25, 2018

(54) APPARATUS AND METHOD FOR BEAM HARDENING ARTIFACT CORRECTION OF CT IMAGE

(71) Applicant: General Electric Company, Schenectady, NY (US)

(72) Inventors: Ximiao Cao, Beijing (CN); Jiang Hsieh, Waukesha, WI (US); Xueli Wang, Beijing (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/281,396

(22) Filed: Sep. 30, 2016

(65) Prior Publication Data

US 2017/0091932 A1    Mar. 30, 2017

(30) Foreign Application Priority Data

Sep. 30, 2015  (CN) .......................... 2015 1 0639130

(51) Int. Cl.
*G06K 9/00* (2006.01)
*G06T 7/00* (2017.01)
*G06T 5/00* (2006.01)
*G06T 11/00* (2006.01)

(52) U.S. Cl.
CPC ............ *G06T 7/0012* (2013.01); *G06T 5/005* (2013.01); *G06T 11/003* (2013.01); *G06T 2207/10081* (2013.01); *G06T 2207/30008* (2013.01)

(58) Field of Classification Search
CPC ..... G06T 7/0012; G06T 5/005; G06T 11/003; G06T 2207/10081; G06T 2207/30008
See application file for complete search history.

(56) References Cited

U.S. PATENT DOCUMENTS

| | | | | |
|---|---|---|---|---|
| 9,326,743 B2* | 5/2016 | Shen | ....................... | G01V 5/005 |
| 9,554,766 B2* | 1/2017 | Kyriakou | ............. | A61B 6/4085 |
| 2008/0159469 A1* | 7/2008 | Ruhrnschopf | ......... | A61B 6/032 |
| | | | | 378/4 |
| 2008/0273651 A1* | 11/2008 | Boas | ..................... | G06T 11/005 |
| | | | | 378/4 |
| 2011/0116697 A1* | 5/2011 | Dafni | .................... | G06T 11/008 |
| | | | | 382/131 |
| 2013/0243298 A1* | 9/2013 | Bredno | ..................... | G06T 5/50 |
| | | | | 382/131 |

(Continued)

FOREIGN PATENT DOCUMENTS

CN    103186883 A    7/2013

*Primary Examiner* — Gregory M Desire (57) ABSTRACT

The present invention provides an apparatus and method for beam hardening artifact correction of CT image, comprising a bone tissue image obtain module, a first correction module, an orthographic projection module, and a correction image obtaining module. The bone tissue image obtain module is used to extract a bone tissue image from a reconstructed original image; the first correction module is used to increase a current CT value of the bone tissue image; the orthographic projection module is used to perform an orthographic projection on the bone tissue image with the CT value being increased to obtain an orthographic projection data of the bone tissue image; the correction image obtaining module is used to perform image reconstruction according to the orthographic projection data of the bone tissue image described above and obtain a correction image.

14 Claims, 8 Drawing Sheets

(56) References Cited

U.S. PATENT DOCUMENTS

2013/0267841 A1* 10/2013 Vija .................... A61B 5/0035
                                                    600/427
2016/0110893 A1* 4/2016 Pang .................... A61B 6/5205
                                                    382/131
2017/0091932 A1* 3/2017 Cao ..................... G06T 11/003

* cited by examiner

APPARATUS AND METHOD FOR BEAM HARDENING ARTIFACT CORRECTION OF CT IMAGE

FIELD OF THE INVENTION

The present invention relates to a field of X-ray detecting, particularly to an apparatus and method for beam hardening artifact correction of CT image.

BACKGROUND

Since X-ray is multicolor spectroscopy ray, in Computed Tomography (CT) medical imaging technology, X-ray with higher energy has lower attenuation than the X-ray with lower energy. With the projection thickness of X-ray increasing, X-ray with higher energy become more, causing beam hardening phenomenon, thus the beam hardening artifact exists in the reconstructed image.

At present, the beam hardening artifact may be reduced by some correction methods which are not ideal for the beam hardening artifact caused by a bone tissue.

For example, in prior art, the original image is obtained by reconstructing the original projection data, a bone tissue image is extracted from the reconstructed original image, the extracted bone tissue image is projected, and the beam hardening artifact is corrected based on the projection data of the bone tissue image.

However, due to beam hardening, the obtained original projection data itself may be not accurate, so that neither the extracted bone tissue image nor the projection data of the bone tissue image is accurate, thus it is difficult to obtain more accurate correction data.

Figure 12:
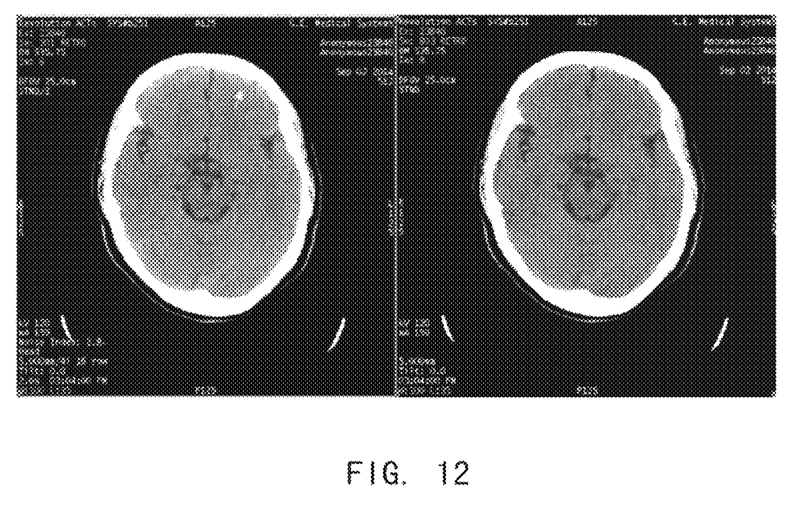
Figure 13:
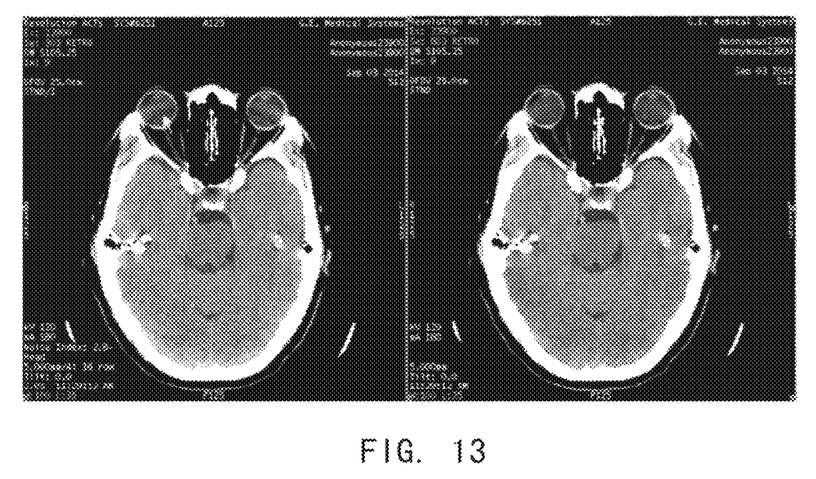
Figure 14:
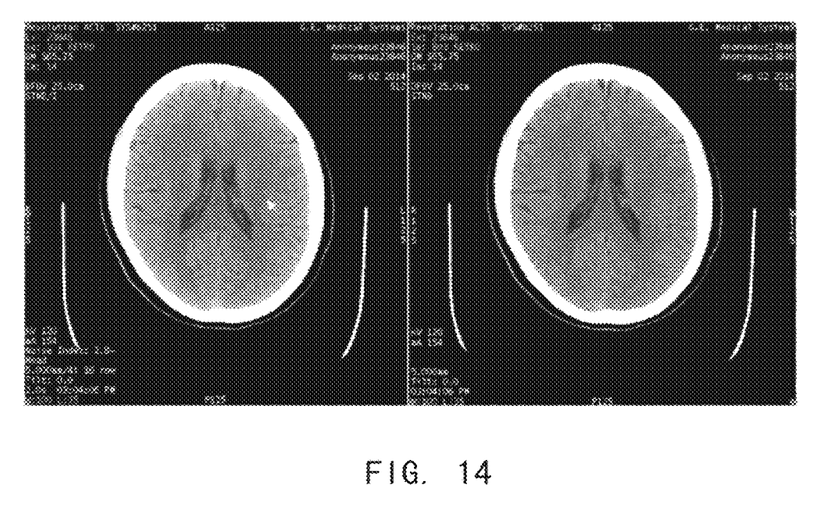
Figure 15:
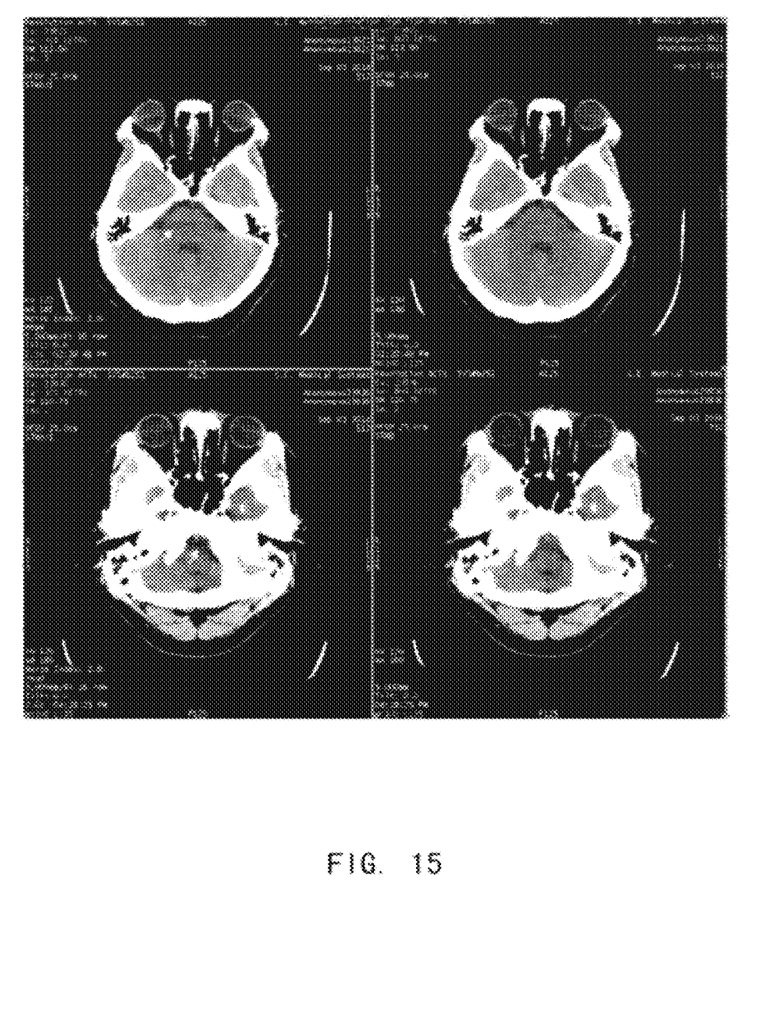

Both FIG. 12a and FIG. 12b are images obtained after performing the beam hardening correction on human brain image in prior art. As shown in FIG. 12a and FIG. 12b, after the image correction using the currently existing correction method, the beam hardening artifact is less, but the point where the bone tissue around the brain connects with the soft tissue is still obscure.

SUMMARY

One object of the present invention is to provide an apparatus and method for beam hardening artifact correction of CT image which may accurately correct the beam hardening artifact in the CT image to obtain a clearer CT image.

An exemplary embodiment of present invention provides an apparatus for beam hardening artifact correction of CT image, comprising a bone tissue image obtain module, a first correction module, an orthographic projection module, and a correction image obtaining module. The bone tissue image obtain module is used to extract a bone tissue image from a reconstructed original image; the first correction module is used to increase a current CT value of the bone tissue image; the orthographic projection module is used to perform an orthographic projection on the bone tissue image with the CT value being increased to obtain an orthographic projection data of the bone tissue image; the correction image obtaining module is used to perform image reconstruction according to the orthographic projection data of the bone tissue image described above and obtain a correction image.

An exemplary embodiment of present invention further provides a method for beam hardening artifact correction of CT image, comprising: extracting a bone tissue image from the reconstructed original image; increasing a current CT value of the bone tissue image; performing an orthographic projection on the bone tissue image with the CT value being increased to obtain an orthographic projection data of the bone tissue image; and performing an image reconstruction according to the orthographic projection data of the bone tissue image and obtaining a corrected image.

Other features and aspects will be apparent through the following detailed description, figures and claims.

BRIEF DESCRIPTION OF THE DRAWINGS

The present invention can be understood better in light of the description of exemplary embodiments of the present invention with reference to the accompanying drawings, in which.

DETAILED DESCRIPTION

Hereafter, a detailed description will be given for preferred embodiments of the present disclosure. It should be pointed out that in the detailed description of the embodiments, for simplicity and conciseness, it is impossible for the Description to describe all the features of the practical embodiments in details. It should be understood that in the process of a practical implementation of any embodiment, just as in the process of an engineering project or a designing project, in order to achieve a specific goal of the developer and in order to satisfy some system-related or business-related constraints, a variety of decisions will usually be made, which will also be varied from one embodiment to another. In addition, it can also be understood that although the effort made in such developing process may be complex and time-consuming, some variations such as design, manufacture and production on the basis of the technical contents disclosed in the disclosure are just customary technical means in the art for those of ordinary skilled in the art associated with the contents disclosed in the present disclosure, which should not be regarded as insufficient disclosure of the present disclosure.

Unless defined otherwise, all the technical or scientific terms used in the Claims and the Description should have the same meanings as commonly understood by one of ordinary skilled in the art to which the present disclosure belongs. The terms "first", "second" and the like in the Description and the Claims of the present utility model do not mean any sequential order, number or importance, but are only used for distinguishing different components. The terms "a", "an" and the like do not denote a limitation of quantity, but denote the existence of at least one. The terms "comprises", "comprising", "includes", "including" and the like mean that the element or object in front of the "comprises", "comprising", "includes" and "including" covers the elements or objects and their equivalents illustrated following the "comprises", "comprising", "includes" and "including", but do not exclude other elements or objects. The term "coupled" or "connected" or the like is not limited to being connected physically or mechanically, nor limited to being connected directly or indirectly.

Figure 1:
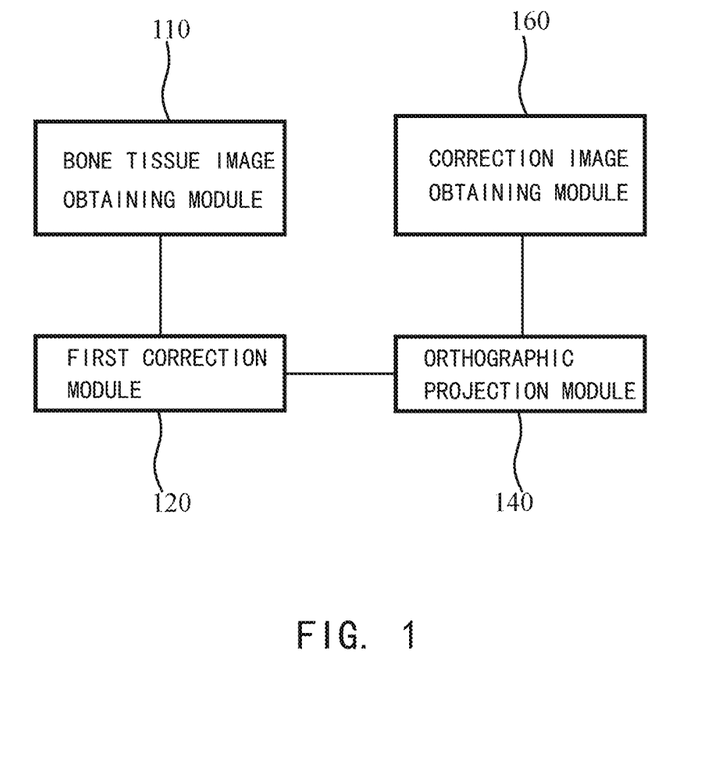
FIG. 1 is a block diagram of an apparatus for beam hardening artifact correction of CT image provided by an embodiment of the present invention.

FIG. 1 is a block diagram of an apparatus for beam hardening artifact correction of CT image provided by an embodiment of the present invention. As shown in FIG. 1, the apparatus comprises a bone tissue image obtain module 110, a first correction module 120, an orthographic projection module 140, and a correction image obtaining module 160.

The bone tissue image obtain module 110 is used to extract a bone tissue image from a reconstructed original image. The "reconstructed original image" described above may be, for example, an image obtained by performing image reconstruction based on an original image acquired from a detector.

The first correction module 120 is used to increase the current CT value of the bone tissue image described above.

The orthographic projection module 140 is used to perform an orthographic projection on the bone tissue image with the CT value being increased to obtain an orthographic projection data of the bone tissue image.

The correction image obtaining module 160 is used to perform image reconstruction according to the orthographic projection data of the bone tissue image described above and obtain a corrected image. For example, the image reconstruction is performed according to the orthographic projection data in combination of the original data, to obtain the corrected image of the object to be scanned.

In above embodiment, error of CT value decreasing due to bone tissue beam hardening is compensated by extracting the bone tissue image and increasing its current CT value, whereby obtaining a more accurate orthographic projection data of the bone tissue image, so that the corrected image reconstructed from the orthographic projection data is more accurate.

Furthermore, as described above, when the first correction module 120 increases the current CT value, the difference between the CT value after increased and the current CT value of the bone tissue image increases with the current CT value increasing.

Figure 2:
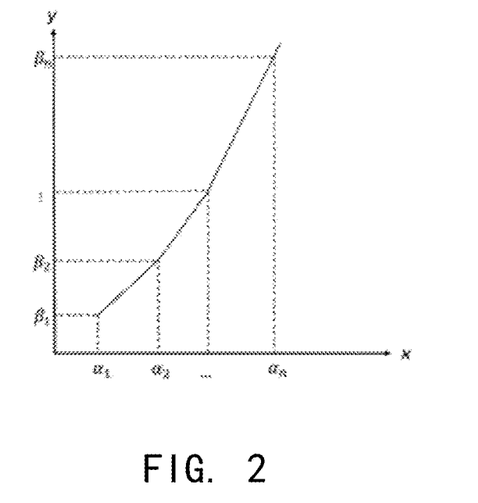
FIG. 2 is a graph for increasing the current CT value of the bone tissue image by the first correction module 120 in FIG. 1 in one exemplary embodiment of the present invention.
Figure 3:
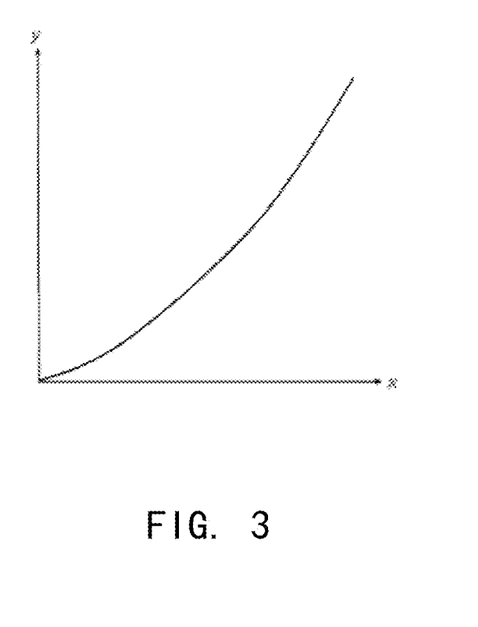
FIG. 3 is a graph for increasing the current CT value of the bone tissue image by the first correction module 120 in FIG. 1 in another exemplary embodiment of the present invention.

FIG. 2 is a graph for increasing the current CT value of the bone tissue image by the first correction module 120 in FIG. 1 in one exemplary embodiment of the present invention; FIG. 3 is a graph for increasing the current CT value of the bone tissue image by the first correction module 120 in FIG. 1 in another exemplary embodiment of the present invention; In the graphs as shown in FIGS. 2, 3, x-axis represents the current CT value of the bone tissue image, and y-axis represents the CT value of the bone tissue image after increased by the first correction module 120. It can be known from FIGS. 2, 3 that the bigger the current CT value of the bone tissue image, the higher the increasing magnitude to the current CT value by the first correction module 120.

For example, as shown in FIG. 2, in scope of a plurality of current CT values not coincident with each other of the bone tissue image, the first correction module 120 linearly increases the current CT values of the bone tissue image. That is, when the first correction module 120 increases the current CT values of the bone tissue image, the current CT values of the bone tissue image are divided into a plurality of numerical ranges not coincident with each other, such as the ranges $(\alpha_1 \sim \alpha_2)(\alpha_2 \sim \alpha_3) \ldots (\alpha_{n-1} \sim \alpha_n)$, in each numerical range, CT value increases linearly.

Therefore, in the present embodiment, the current CT values of the bone tissue image may be increased by the following equation (1):

$$y = \begin{cases} 0 & x < \alpha_1 \\ \beta_1 + \dfrac{\beta_2 - \beta_1}{\alpha_2 - \alpha_1}(x - \alpha_1) & \alpha_1 < x < \alpha_2 \\ \beta_{n-1} + \dfrac{\beta_n - \beta_{n-1}}{\alpha_n - \alpha_{n-1}}(x - \alpha_{n-1}) & \alpha_{n-1} < x < \alpha_n \\ \beta_n + \dfrac{\beta_n - \beta_{n-1}}{\alpha_n - \alpha_{n-1}}(x - \alpha_n) & \alpha_n < x \end{cases} \quad (1)$$

In above equation (1), x, $\alpha_1, \alpha_2 \ldots \alpha_n$ represent the current CT values of the bone tissue image, y, $\beta_1, \beta_2 \ldots \beta_n$ represent the CT values of the bone tissue image after increased by the first correction module 120, n is larger than 1.

For another example, as shown in FIG. 3, the first correction module 120 may also increase the current CT values of the bone tissue image according to the following equation (2):

$$y = \sum_{k=1}^{n} \alpha_k x^k, \quad (2)$$

In above equation (2), x represents the current CT value of the bone tissue image, y represents the CT value of the bone tissue image after increased by the first correction module 120, $\alpha_k$ is regulation factor, n is the number of items of the polynomial, and n is larger than or equal to 1.

Figure 4:
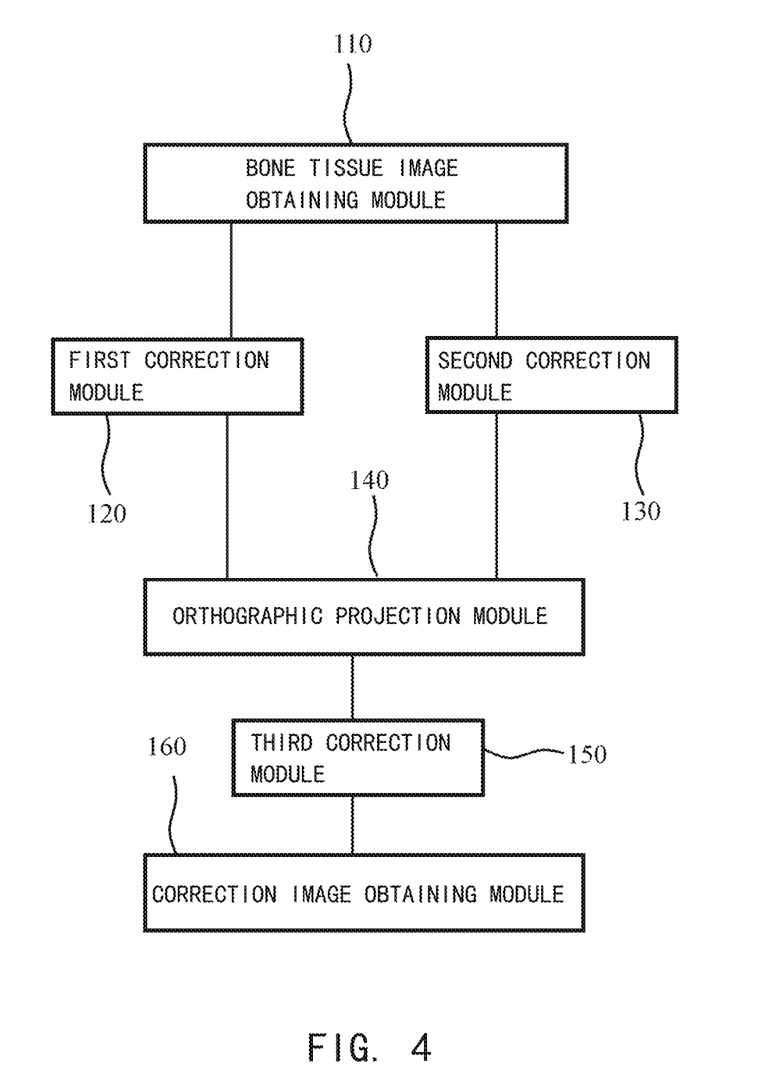
FIG. 4 is a block diagram of an apparatus for beam hardening artifact correction of CT image provided by another embodiment of the present invention.
Figure 5:
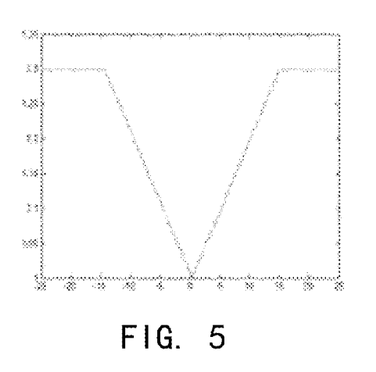
FIGS. 5, 6, 7, 8, and 9 are graphs for increasing the current CT value of the bone tissue image by the second correction module 130 in FIG. 4 in an exemplary embodiment of the present invention, respectively.
Figure 6:
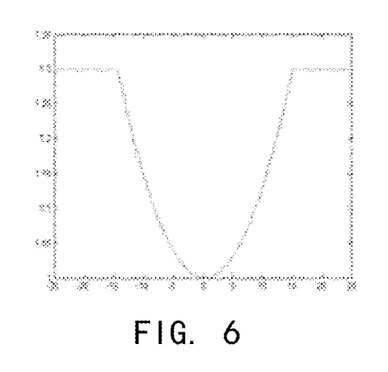
Figure 7:
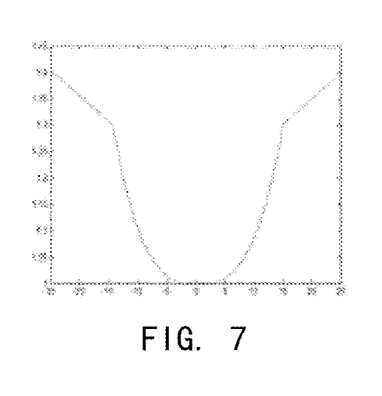
Figure 8:
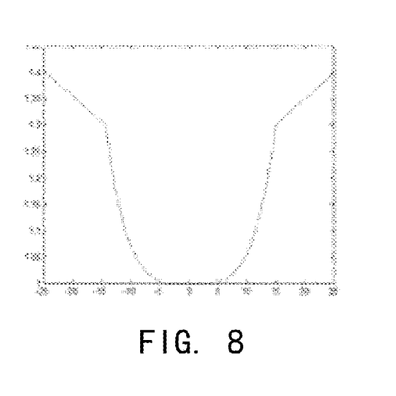

FIG. 4 is a block diagram of an apparatus for beam hardening artifact correction of CT image provided by another embodiment of the present invention. In CT scanning apparatus, since X-ray after emitted is filtered by ray-filter, then emitted to the object to be scanned, the shapes of the ray-filters used in different scanning apparatus are different, and the thicknesses of the same ray-filter in different position may also be different, when X-ray transmits through the ray-filter, the ray through the thicker portion may generate more beam hardening, and the ray through the thinner portion may generate less beam hardening. As shown in FIG. 4, in the present embodiment, in order to further compensate the error of CT value decreasing due to beam hardening caused by the ray-filter, the apparatus for beam hardening artifact correction of CT image described above further comprises a second correction module 130 which is used to correct the current CT value according to the thickness of the ray-filter through which the ray corresponding to the current CT value of the bone tissue image transmits.

Among others, the second correction module 130 increases the current CT value corresponding to the ray except for the ray through the thinnest portion of the ray-filter, and with the thickness of the ray-filter through which the ray corresponding to the current CT value of the bone tissue image transmits increasing, the increasing magnitude to the current CT value by the second correction module 130 become higher.

FIGS. 5, 6, 7, 8, and 9 are graphs for increasing the current CT value of the bone tissue image by the second correction module 130 in FIG. 4 in an exemplary embodiment of the present invention, respectively. As shown in FIGS. 5-10, in the embodiment of the present invention, description is made by taking a bowtie as an example, the bowtie is thinnest in the middle portion and thickens from middle portion to two sides gradually.

In above graphs, the horizontal axis represents the distance of ray from ISO center, where the ray in the center of the ray beam goes through the ISO center, and through the center of the bowtie (i.e the thinnest portion of the bowtie), corresponding to the "0" of the horizontal axis of the graphs. Therefore, in FIGS. 5-8, CT value corresponding to the ray in the center of the ray beam does not change, that is, the second correction module 130 does not increase the CT value corresponding to the ray in the center of the ray beam. The rays from the center to two sides of the ray beam are getting farther and farther away from the ISO center, correspondingly, the thickness of the bowtie being transmitted through become larger and larger, thus magnitude to the corresponding CT value become higher. Therefore, the second correction module 130 may correct the current CT values of the bone tissue image according to the graphs shown in FIGS. 5-8.

Figure 9:
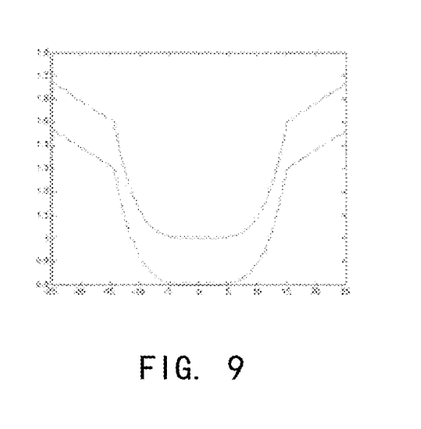

Alternatively, as shown in FIG. 9, the second correction module 130 may also correct the current CT value corresponding to the ray through the thinnest portion of the ray-filter, that is, correcting the current CT values of the bone tissue image according to the graph shown in FIG. 9.

The "current CT value of the bone tissue image" described above refers to the CT value of the bone tissue image before corrected by the first correction module 120 or the second correction module 130. In the present embodiment, after extracting the bone tissue image, its CT value may be corrected by the first correction module 120 at first, after the correction by the first correction module 120 completed, the corrected CT value is obtained. The corrected CT value is used as the "current CT value" which may be further corrected by the second correction module 130. Or, the second correction module 130 may correct at first, then the first correction module 120 corrects.

As shown in FIG. 3, alternatively, in order to further reduce the bone tissue beam hardening artifact, the apparatus for beam hardening artifact correction of CT image of present invention further comprises a third correction module 150 which is used to perform a second order polynomial fitting or quadratic polynomial fitting on the orthographic projection data of the bone tissue image, to obtain more accurate orthographic projection data. At this point, the correction image obtaining module 160 is used to perform the image reconstruction according to fitted orthographic projection data of the bone tissue image to obtain the corrected image.

For example, the error data due to the beam hardening may be obtained by performing the polynomial fitting on the orthographic projection data of the bone tissue image. The correction image obtaining module 160 may remove the error data from the orthographic projection data to obtain more accurate orthographic projection data and perform the image reconstruction in combination of the original data.

The fitting method for performing the polynomial fitting on data is common knowledge, which will not be repetitively described herein.

Figure 10:
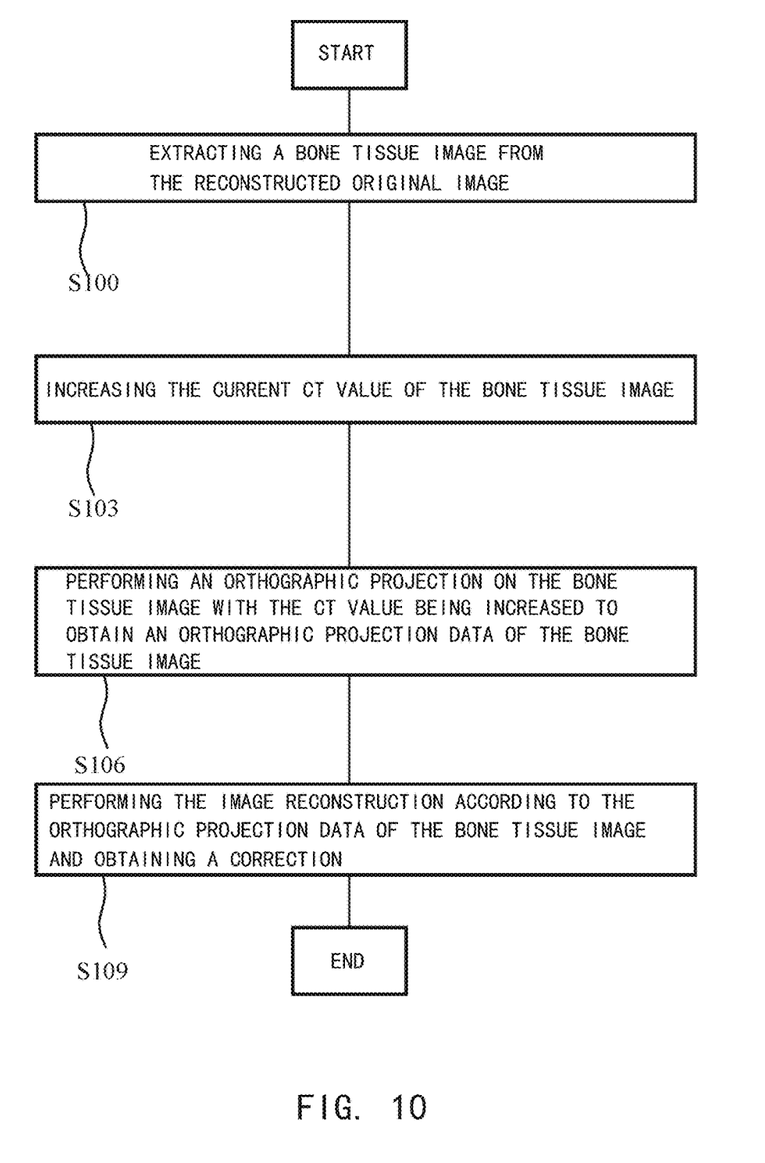
FIG. 10 is a flow chart of a method for beam hardening artifact correction of CT image provided by an embodiment of the present invention.
Figure 11:
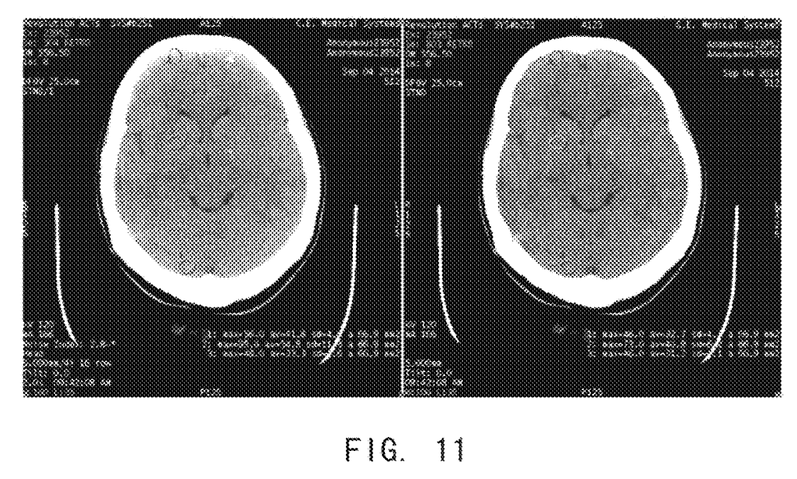
FIGS. 11-15 are comparison diagrams between CT images of human brain obtained by using the technical solution of the present invention and the currently existing technology.

FIG. 10 is a flow chart of a method for beam hardening artifact correction of CT image provided by an embodiment of the present invention. As shown in FIG. 10, the method comprises the following steps:

Step S100: extracting a bone tissue image from the reconstructed original image;

Step S103: increasing the current CT value of the bone tissue image;

Step S106: performing an orthographic projection on the bone tissue image with the CT value being increased to obtain an orthographic projection data of the bone tissue image; and Step S109: performing the image reconstruction according to the orthographic projection data of the bone tissue image and obtaining a corrected image.

Alternatively, at step S103, the difference between the CT value after increased and the corresponding current CT value of the bone tissue image increases with the current CT value increasing. For example, at step S103, the current CT value of the bone tissue image may be increased according to the graphs shown in FIGS. 2-3.

Further, taking FIG. 2 as an example, at step S103, in scope of a plurality of current CT values not coincident with each other of the bone tissue image, the current CT values of the bone tissue image may be increased linearly, for example, the current CT values of the bone tissue image may be increased according to equation (1).

Taking FIG. 3 as an example, at step S103, the current CT value of the bone tissue image may also be increased according to equation (2) described above.

Alternatively, the following steps may comprised before step S103 or after step S103.

Correcting the current CT value of the bone tissue image according to the thickness of the ray-filter through which the ray corresponding to the current CT value of the bone tissue image transmits, comprising: increasing the current CT value corresponding to the ray except for the ray through the thinnest portion of the ray-filter, and with the thickness of the ray-filter through which the ray corresponding to the current CT value of the bone tissue image transmits increasing, the increasing magnitude to the current CT value by the second correction module 130 becoming higher. For example, when the ray-filter is in form of bowtie, the current CT value of the bone tissue image may be corrected according to any one of the graphs as shown in FIGS. 5-8, so that the CT value error due to the beam hardening caused by ray through the ray-filter may be reduced or eliminated.

In particular, "correcting the current CT value of the bone tissue image according to the thickness of the ray-filter through which the ray corresponding to the current CT value of the bone tissue image transmits" further comprises: increasing the current CT value corresponding to the ray through the thinnest portion of the ray-filter; for example, correcting the current CT values of the bone tissue image according to the graph shown in FIG. 9.

Alternatively, the following steps may be comprised before step S109:

performing a second order polynomial fitting or quadratic polynomial fitting on the orthographic projection data of the bone tissue image. At this point, at Step S106: performing the image reconstruction according to the fitted orthographic projection data of the bone tissue image and obtaining a corrected image.

In embodiments of the present invention, error of CT value decreasing due to bone tissue beam hardening is reduced or eliminated by extracting the bone tissue image and increasing its current CT value, whereby obtaining a more accurate orthographic projection data of the bone tissue image, so that the corrected image reconstructed from the orthographic projection data is more accurate.

FIGS. 11-15 are comparison diagrams between CT images of human brain obtained by using the technical solution of the present invention and the currently existing technology. In FIGS. 11-15, the images in the left are CT images obtained by using the prior art, and the images in the right are CT images obtained by using the technical solution of the present invention. It can be known from the comparison of FIG. 11 that in the image obtained by using the prior art, the portion where the bone tissue around the brain connects with the soft tissue is obscure, but in the CT image obtained by using the technical solution of the present invention, the portion where the bone tissue around the brain connects with the soft tissue become clear. It can be known from the comparison of FIG. 12 that the CT image obtained by using the technical solution of the present invention has a better uniformity. It can be known from the comparison of FIG. 13 that, in the CT image obtained by using the technical solution of the present invention, the eye image has a better uniformity. It can be known from the comparison of FIG. 14 that, in the CT image obtained by using the technical solution of the present invention, the low contrast resolution is higher. It can be known from the comparison of FIG. 15 that, in the CT image obtained by using the technical solution of the present invention, the beam hardening of the sphenoid is removed.

Some exemplary embodiments have been described in the above. However, it should be understood that various modifications may be made thereto. For example, if the described techniques are carried out in different orders, and/or if the components in the described system, architecture, apparatus or circuit are combined in different ways and/or replaced or supplemented by additional components or equivalents thereof, proper results may still be achieved. Accordingly, other embodiments are also falling within the protection scope of the claims.

What is claimed is:

1. An apparatus for beam hardening artifact correction of CT image, comprising:
   a bone tissue image obtain module to extract a bone tissue image from a reconstructed original image;
   a first correction module to increase a current CT value of the bone tissue image after the bone tissue image is extracted;
   an orthographic projection module to perform an orthographic projection on the bone tissue image with the CT value being increased to obtain orthographic projection data of the bone tissue image; and
   a correction image obtaining module to perform image reconstruction according to the orthographic projection data of the bone tissue image described above and obtain a corrected image.

2. The apparatus for beam hardening artifact correction of CT image of claim 1, wherein when the first correction module increases the current CT value of the bone tissue image, the difference between the CT value after increased and the corresponding current CT value of the bone tissue image increases with the current CT value increasing.

3. The apparatus for beam hardening artifact correction of CT image of claim 2, wherein the first correction module linearly increases current CT values of a plurality of current CT values that are not coincident with each other of the bone tissue image.

4. The apparatus for beam hardening artifact correction of CT image of claim 2, wherein the first correction module increases the current CT value of the bone tissue image according to the following equation:

$$y = \sum_{i=1}^{n} \alpha_k x^k,$$

where x represents the current CT value of the bone tissue image, y represents a corrected CT value of the bone tissue image, $\alpha_k$ is a regulation factor, n is a number of items of the polynomial, and n is larger than or equal to 1.

5. The apparatus for beam hardening artifact correction of CT image of claim 1, further comprising:
   a second correction module to correct the current CT value of the bone tissue image according to a thickness of a ray-filter through which a ray corresponding to the current CT value of the bone tissue image transmits, wherein,
   the second correction module increases the current CT value corresponding to the ray except for the ray through a thinnest portion of the ray-filter, and with the thickness of the ray-filter through which the ray corresponding to the current CT value of the bone tissue image transmits increasing, an increasing magnitude to the current CT value by the second correction module becomes higher.

6. The apparatus for beam hardening artifact correction of CT image of claim 5, wherein the second correction module further increases the current CT value corresponding to the ray through the thinnest portion of the ray-filter.

7. The apparatus for beam hardening artifact correction of CT image of claim 1, further comprising a third correction module which is used to perform a second order polynomial fitting or quadratic polynomial fitting on the orthographic projection data of the bone tissue image, and the correction image obtaining module is used to perform the image reconstruction according to the fitted orthographic projection data of the bone tissue image and obtain the corrected image.

8. A method for beam hardening artifact correction of CT image, comprising:
   extracting a bone tissue image from a reconstructed original image;
   increasing a current CT value of the bone tissue image after extracting the bone tissue image;
   performing an orthographic projection on the bone tissue image with the CT value being increased to obtain orthographic projection data of the bone tissue image; and
   performing an image reconstruction according to the orthographic projection data of the bone tissue image and obtaining a corrected image.

9. The method for beam hardening artifact correction of CT image of claim 8, wherein the step of increasing a current CT value of the bone tissue image a difference between the CT value after the increase and the corresponding current CT value of the bone tissue image, increases with the current CT value increasing.

10. The method for beam hardening artifact correction of CT image of claim 9, wherein the step of increasing a current CT value of the bone tissue image comprises increasing a plurality of current CT values that are not coincident with each other of the bone tissue image linearly.

11. The method for beam hardening artifact correction of CT image of claim 9, wherein the step of increasing a current CT value of the bone tissue image comprises increasing the current CT value of the bone tissue image according to the following equation:

$$y = \sum_{k=1}^{n} \alpha_k x^k,$$

where x represents the current CT value of the bone tissue image, y represents an increased CT value of the bone tissue image, $\alpha_k$ is a regulation factor, n is a number of items of the polynomial, and n is larger than or equal to 1.

12. The method for beam hardening artifact correction of CT image of claim 8, further comprising: before or after the step of increasing a current CT value of the bone tissue image,
correcting the current CT value of the bone tissue image according to a thickness of a ray-filter through which a ray corresponding to the current CT value of the bone tissue image transmits, which comprises: increasing the current CT value corresponding to the ray except for the ray through a thinnest portion of the ray-filter, and with the thickness of the ray-filter through which the ray corresponding to the current CT value of the bone tissue image transmits increasing, an increasing magnitude to the current CT value becoming higher.

13. The method for beam hardening artifact correction of CT image of claim 12, wherein the correcting of the current CT value of the bone tissue image according to the thickness of the ray-filter through which the ray corresponding to the current CT value of the bone tissue image transmits further comprises: increasing the current CT value corresponding to the ray through the thinnest portion of the ray-filter.

14. The method for beam hardening artifact correction of CT image of claim 8, further comprising: before performing an image reconstruction according to the orthographic projection data of the bone tissue image and obtaining a corrected image,
performing a second order polynomial fitting or quadratic polynomial fitting on the orthographic projection data of the bone tissue image; and
the step performing an image reconstruction according to the orthographic projection data of the bone tissue image and obtaining a corrected image is performing an image reconstruction according to the fitted orthographic projection data of the bone tissue image and obtaining a corrected image.

* * * * *